United States Patent [19]

Sim

[11] Patent Number: 5,623,837
[45] Date of Patent: Apr. 29, 1997

[54] AIR CONDITIONING SYSTEM FOR A VEHICLE

[75] Inventor: Hwan-Oh Sim, Kyungsangnam-Do, Rep. of Korea

[73] Assignee: Hyundai Motor Company, Ltd., Seoul, Rep. of Korea

[21] Appl. No.: 458,872

[22] Filed: Jun. 2, 1995

[30] Foreign Application Priority Data

Jun. 3, 1994 [KR] Rep. of Korea ................ 94-12954

[51] Int. Cl.$^6$ ........................................... F25D 17/06
[52] U.S. Cl. ........................................ 62/419; 62/429
[58] Field of Search ........................... 62/404, 419, 429, 62/239

[56] References Cited

U.S. PATENT DOCUMENTS

| | | | |
|---|---|---|---|
| 2,977,774 | 4/1961 | Ferris | 62/429 |
| 2,986,904 | 6/1961 | Williamson | 62/429 |
| 3,756,039 | 9/1973 | Riello | 62/262 |
| 5,094,089 | 3/1992 | Lail | 62/429 |
| 5,383,341 | 1/1995 | Zur et al. | 62/476 |

FOREIGN PATENT DOCUMENTS

| | | | |
|---|---|---|---|
| 59517 | 4/1984 | Japan | 62/239 |
| 62526 | 4/1985 | Japan | 62/429 |

*Primary Examiner*—William Doerrler
*Attorney, Agent, or Firm*—Birch, Stewart, Kolasch & Birch, LLP

[57] ABSTRACT

An air conditioning system for a vehicle includes an evaporator disposed at a slant at an exhaust side of at least one blow fan and blow motor, and at least one blow case disposed around the at least one blow fan for controlling a blown quantity of air so as to homogenize the air flow, thereby saving expense, and reducing the weight of the air conditioning system.

5 Claims, 2 Drawing Sheets

AIR CONDITIONING SYSTEM FOR A VEHICLE

BACKGROUND OF THE INVENTION

1. Field of the Invention

The present invention relates to an air conditioning system for a vehicle and more particularly, to an improved air conditioning system for a vehicle, which includes an evaporator disposed at an exhaust side of at least one blow fan and a blow motor for uniformly blowing air and saving expense to the manufacturer.

2. Description of Related Art

Various types of air conditioning systems for a vehicle are known in the art. Generally, such conventional air conditioning systems include at least two blow fans and at least two blow motors. That is, one set of a blow fan and motor, and another set of a blow fan and motor, located in a straight line with respect to each other.

As shown in FIGS. 1 and 2, the conventional air conditioning system comprises a unit case 10, an evaporator 12 disposed at a slant in the unit case 10, and a pair of blow fans 16 and corresponding motors 14, and a blow case 18 being disposed around each fan 16 for providing a smooth flow of air. An air inlet 11 and an air outlet 13 are disposed in advance of the blow fan 16 and subsequent to the evaporator 12 for inducing the intake of air flow and the exhaust of air flow.

Accordingly, the conventional air conditioning system operates as follows (FIG. 2). Air is introduced by the suction power of the blow fans 16 through the inlet 11. Thereafter the air flow moves through the evaporator 12 and the blow fans 16. Finally, the air flow passes to the interior of the vehicle through the blow case 18 and an outlet 13.

However, such conventional air conditioning systems suffer from a number of problems such as, for example, a quantity of blown air is not balanced since both blow fans do not generate an equal blowing quantity upon operation of both blow motors, it is heavy due to the pair of blow fans and motors, and it is expensive to manufacture.

SUMMARY OF THE INVENTION

Accordingly, it is an object of the present invention to provide an air conditioning system for a vehicle, which eliminates the above problems encountered with the conventional air conditioning systems for a vehicle.

Another object of the present invention is to provide an improved air conditioning system for a vehicle, which includes a unit case, at least one blow fan and blow motor disposed in the unit case, an evaporator disposed at a slant at an exhaust side of the at least one blow fan which has a blow case disposed therearound, respectively, for uniformly controlling a blowing quantity through the at least one blow fan, thereby saving expense to the manufacturer, and reducing the weight of the air conditioning system.

A further object of the present invention is to provide an air conditioning system for a vehicle, which includes a blow fan, a blow motor for operating the blow fan, a blow case, and an evaporator disposed within a unit case for effectively homogenizing the air flow through only one blow fan, thereby saving expense, and providing a simple structure.

Still another object of the present invention is to provide an air conditioning system for a vehicle which is simple in structure, inexpensive to manufacture, and durable in use.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an air conditioning system for a vehicle, which includes an evaporator disposed at a slant at an exhaust side of at least one blow fan and blow motor, and at least one blow case disposed around the blow fan for controlling a quantity of blown air so as to homogenize the air flow, thereby saving expense, and reducing the weight of the air conditioning system.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
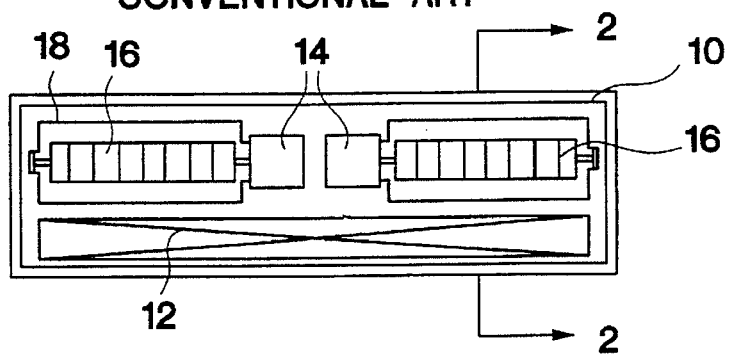
FIG. 1 is a partially diagrammatic top plan view of a conventional air conditioning system for a vehicle.
Figure 2:
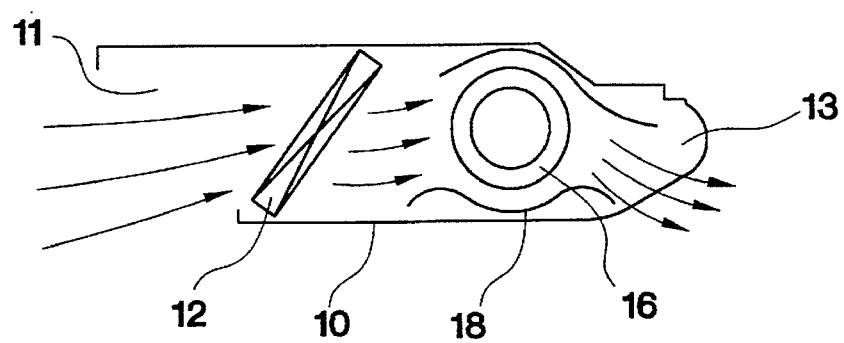
FIG. 2 is a sectional view taken along line 2—2 of FIG. 1.
Figure 3:
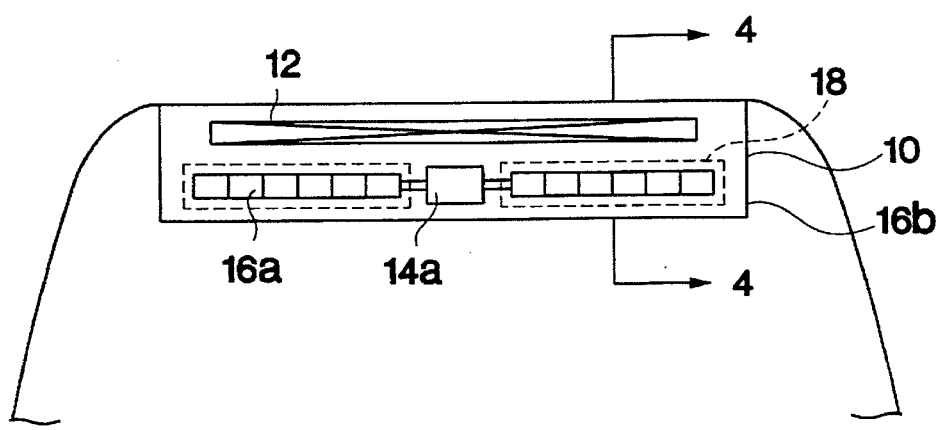
FIG. 3 is a partially diagrammatic top plan view of an air conditioning system for a vehicle according to the present invention.
Figure 4:
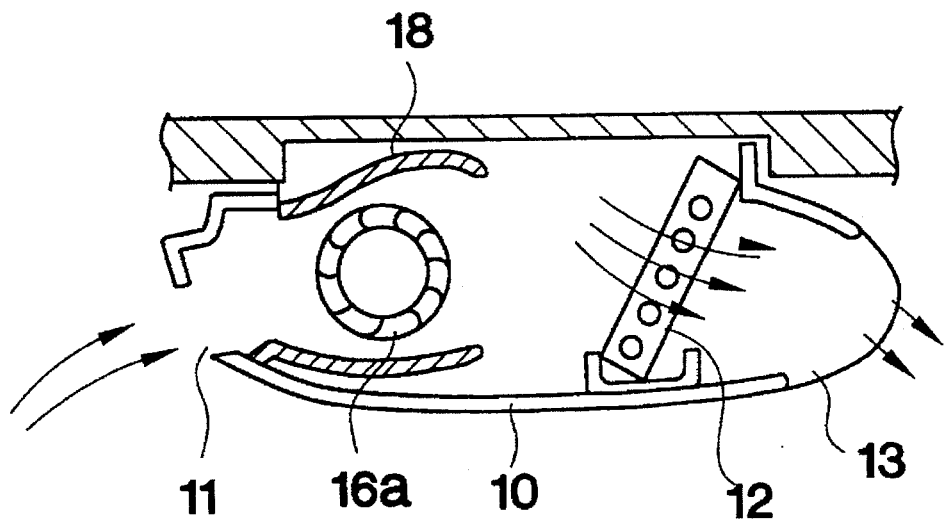
FIG. 4 is a sectional view taken along line 4—4 of FIG. 3.
Figure 5:
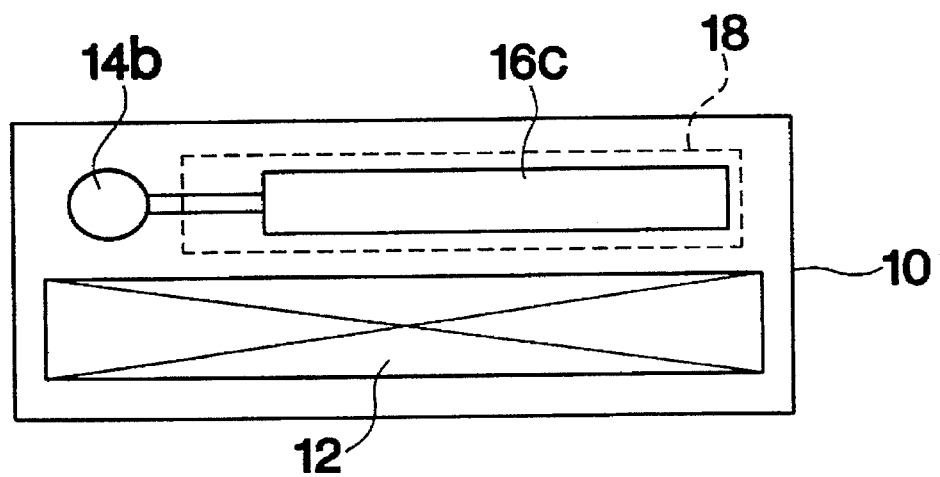
FIG. 5 is a partially diagrammatic top plan view of an additional embodiment of the air conditioning system for a vehicle according to the present invention.

Referring now in detail to the drawings for the purpose of illustrating preferred embodiments of the present invention, the air conditioning system for a vehicle as shown in FIGS. 3, 4, and 5, comprises a unit case 10, a pair of blow fans 16a and 16b, a blow motor 14a disposed in the unit case 10, an evaporator 12 disposed at a forward slant at an exhaust side of the blow fans 16a, 16b, and a blow case 18a, 18b disposed around each blow fan 16a, 16b for uniformly guiding and thus blowing the air flow.

The pair of blow fans 16a and 16b are operated by the same blow motor 14a so that the pair of blow fans 16a and 16b operate under the same power and conditions. Accordingly, both blow fans 16a and 16b generate the same quantity of air flow therefrom for providing homogeneous air flow. In addition, since only one blow motor 14a is provided in the air conditioning system, it is inexpensive to manufacture and it has a light weight compared with the conventional air conditioning system utilizing two blow motors.

Thus, the air conditioning system according to the present invention includes the evaporator 12 disposed at an exhaust side of the blow fans 16a, 16b and the blow fans positioned within the blow cases 18a, 18b. By this arrangement, the air flow passes the blow fans 16a, 16b and thereafter the air flow accomplishes a heat exchange at the evaporator 12. Therefore, the cooling air smoothly scatters into the seat area within the vehicle through an air outlet 13 in the direction indicated by arrows as shown in FIG. 4.

At this time, the air conditioning system of the present invention does not generate the swirl of the air flow, and eliminates loss of the air flow and delivers cool down homogeneously when compared with the conventional air conditioning system.

In addition, since the pair of blow fans 16a and 16b operate under the same power and conditions, the air flow from the blow fans 16a and 16b through the air inlet 11 streams into the seat area of the vehicle homogeneously through the air outlet 13.

Referring in detail to FIG. 5, there is illustrated an additional embodiment of an air conditioning system for a vehicle in accordance with the present invention.

As shown in FIG. 5, the unit case 10 includes one blow fan 16c operated by one blow motor 14c disposed therewithin. The blow fan 16c includes the blow case 18 disposed therearound for smoothly guiding the air flow therethrough.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air conditioning system for a vehicle, said air conditioning system comprising:

a unit case having an air inlet side and an air outlet side substantially linearly aligned with the air inlet side;

an evaporator disposed immediately adjacent the outlet side of said unit case, said evaporator being slanted for accelerating an air flow and effectively exchanging heat therethrough;

a single blow motor disposed within said unit case; and a pair of blow fans disposed within said unit case on opposing side of blow of and operated by said single blow motor, said pair of blow fans and said single blow motor being aligned parallel to said evaporator;

said evaporator being postitioned intermediate said pair of blow fans aligned with said single blow motor and the air outlet, whereby upon operation of said single blow motor and said pair of blow fans, said pair of blow fans generate a smooth stream of air flow into the seat area of the vehicle through the air side inlet and air side outlet.

2. The air conditioning system according to claim 1, further comprising a pair of blow cases, with one case surrounding one of said pair of blow fans, respectively.

3. The air conditioning system according to claim 1, wherein said single motor operates the pair of blow fans under the same power and conditions, thereby providing homogenous cooling.

4. The air conditioning system according to claim 1, wherein the air inlet side and the air outlet side are arranged to correspond to a longitudinal axis of the vehicle.

5. The air conditioning system according to claim 1, wherein said pair of blow fans and said single blow motor are linearly arranged.

* * * * *